United States Patent
Aitha et al.

(10) Patent No.: US 10,577,512 B2
(45) Date of Patent: Mar. 3, 2020

(54) COMPATIBILIZER FOR UNIVERSAL COLORANT IN SOLVENTBORNE ALKYD PAINTS

(71) Applicant: Evonik Operations GmbH, Essen (DE)

(72) Inventors: Vishwa Prasad Aitha, Essen (DE); Frank Kleinsteinberg, Alpen (DE); Vernon Sze, Singapore (SG); Kerh Li Liu, Singapore (SG); Philippe Favresse, Ratingen (DE)

(73) Assignee: Evonik Operations GmbH, Essen (DE)

(*) Notice: Subject to any disclaimer, the term of this patent is extended or adjusted under 35 U.S.C. 154(b) by 115 days.

(21) Appl. No.: 15/724,510

(22) Filed: Oct. 4, 2017

(65) Prior Publication Data

US 2018/0094146 A1  Apr. 5, 2018

(30) Foreign Application Priority Data

Oct. 5, 2016 (EP) .................................... 16192315

(51) Int. Cl.
| | | |
|---|---|---|
| *C09D 7/63* | (2018.01) | |
| *C09D 167/00* | (2006.01) | |
| *C09D 7/45* | (2018.01) | |
| *C09D 7/65* | (2018.01) | |
| *C08K 5/20* | (2006.01) | |
| *C08K 5/00* | (2006.01) | |
| *C08K 5/17* | (2006.01) | |
| *C08K 3/013* | (2018.01) | |

(52) U.S. Cl.
CPC ................ *C09D 7/63* (2018.01); *C09D 7/45* (2018.01); *C09D 7/65* (2018.01); *C09D 167/00* (2013.01); *C08K 3/013* (2018.01); *C08K 5/0041* (2013.01); *C08K 5/17* (2013.01); *C08K 5/20* (2013.01)

(58) Field of Classification Search
CPC .................................... C09D 7/63; C08K 5/20
See application file for complete search history.

(56) References Cited

U.S. PATENT DOCUMENTS

| | | | |
|---|---|---|---|
| 5,328,685 A | 7/1994 | Janchitraponvej et al. | |
| 5,556,615 A | 9/1996 | Janchitraponvej et al. | |
| 5,985,987 A | 11/1999 | Adolfsson et al. | |
| 7,838,603 B2 | 11/2010 | Schwab et al. | |
| 9,115,335 B2 | 8/2015 | Trosin et al. | |
| 9,738,797 B2 | 8/2017 | Nilewski et al. | |
| 9,751,971 B2 | 9/2017 | Veit et al. | |
| 2006/0276563 A1 | 12/2006 | Osterod et al. | |
| 2008/0221276 A1 | 9/2008 | Schwab et al. | |
| 2011/0144269 A1 | 6/2011 | Kuppert et al. | |
| 2012/0037036 A1 | 2/2012 | Veit et al. | |
| 2012/0157613 A1 | 6/2012 | Poppe et al. | |
| 2013/0225408 A1* | 8/2013 | Allen | C11D 1/75 504/206 |
| 2013/0281552 A1 | 10/2013 | Nilewski et al. | |
| 2014/0163165 A1* | 6/2014 | Schmidt | C09D 4/00 524/606 |
| 2014/0194585 A1 | 7/2014 | Poppe et al. | |
| 2014/0274863 A1 | 9/2014 | Trosin et al. | |
| 2015/0240020 A1 | 8/2015 | Veit et al. | |
| 2015/0344706 A1* | 12/2015 | Paar | C09D 5/082 204/471 |
| 2017/0274335 A1 | 9/2017 | Favresse et al. | |
| 2018/0028994 A1 | 2/2018 | Favresse et al. | |
| 2018/0094146 A1 | 4/2018 | Aitha et al. | |

FOREIGN PATENT DOCUMENTS

| | | |
|---|---|---|
| EP | 2 774 957 A1 | 9/2014 |
| JP | 2013-253055 A | 12/2013 |
| WO | WO 97/08255 A1 | 3/1997 |
| WO | 2008/074564 | 6/2008 |
| WO | 2011/018044 | 2/2010 |
| WO | 2010/046181 | 4/2010 |
| WO | 2011/061004 | 5/2011 |
| WO | 2015/144404 | 10/2015 |
| WO | 2017/009283 | 1/2017 |
| WO | 2017/009297 | 1/2017 |

OTHER PUBLICATIONS

U.S. Appl. No. 11/848,618, filed Aug. 31, 2007, 2008/0221276, Schwab.
U.S. Appl. No. 13/058,372, filed Jul. 16, 2009, 2011/0144269, Kuppert.
U.S. Appl. No. 13/205,834, filed Aug. 9, 2011, 2012/0037036, Veit.
U.S. Appl. No. 13/393,390, filed Oct. 7, 2010, 2012/0157613, Poppe.
U.S. Appl. No. 13/866,526, filed Apr. 19, 2013, 2013/0281552, Nilewski.
U.S. Appl. No. 14/204,459, filed Mar. 11, 2014, 2014/0194585, Poppe.
U.S. Appl. No. 14/216,031, filed Mar. 17, 2014, 2014/0274863, Trosin.
U.S. Appl. No. 14/628,991, filed Feb. 23, 2015, 2015/0240020, Veit.
U.S. Appl. No. 15/127,078, filed Mar. 4, 2015, 2018/0028994, Favresse.
U.S. Appl. No. 15/447,424, filed Mar. 2, 2017, 2017/0274335, Favresse.

(Continued)

*Primary Examiner* — Arrie L Reuther
(74) *Attorney, Agent, or Firm* — Grüneberg and Myers PLLC

(57) ABSTRACT

Solventborne alkyd paint composition containing a universal colorant of organic pigment or inorganic pigment, a solventborne alkyd base paint and a fatty acid amidoamine, where the fatty acid amidoamine is the condensation product of a fatty acid or their corresponding ester or fatty oil and a polyamine, the polyamine is an aliphatic polyamine having an amine functionality of at least 2, and the polyamine contains at least one primary amine group and at least one tertiary amine group.

10 Claims, No Drawings

(56) References Cited

OTHER PUBLICATIONS

U.S. Appl. No. 15/724,510, filed Oct. 4, 2017, 2018/0094146, Aitha.
PCT/EP2007/061868, Nov. 5, 2007, WO 2008/074564, Cavaleiro.
PCT/EP2009/059136, Jul. 16, 2009, WO 2010/018044, Kuppert.
PCT/EP2009/061838, Sep. 14, 2009, WO 2010/046181, Cavaleiro.
PCT/EP2010/064957, Oct. 7, 2010, WO 2011/061004, Poppe.
PCT/EP2015/054494, Mar. 4, 2015, WO 2015/144404, Favresse.
PCT/EP2016/066422, Jul. 11, 2016, WO 2017/009283, Fiedel.
PCT/EP2016/066451, Jul. 11, 2016, WO 2017/009297, Fiedel.
Partial European Search Report dated Jan. 5, 2017 in Patent Application No. 16192315.6.
Extended European Search Report dated Apr. 11, 2017 in Patent Application No. 16192315.6.

\* cited by examiner

COMPATIBILIZER FOR UNIVERSAL COLORANT IN SOLVENTBORNE ALKYD PAINTS

CROSS REFERENCE TO RELATED APPLICATION

This application claims foreign priority to European patent application No. 16192315.6 filed Oct. 5, 2016, the entire contents of which is incorporated herein by reference.

BACKGROUND OF THE INVENTION

Field of the Invention

The invention relates to a compatibilizer with excellent compatibilizing effect for preparing solventborne alkyd paints using universal colorants, with inorganic or organic pigments, and solventborne alkyd base paints.

Description of the Related Art

Universal colorants are used in the coatings market to tint waterborne as well as solventborne base paints.

The universal colorants comprise a water matrix and organic pigments or inorganic pigments. Universal colorants may comprise further additives e.g. dispersants or biocides. Preferably the universal colorant is VOC free.

As universal colorants are waterborne the compatibility with solventborne base paints is limited. Commercially important solventborne base paint are alkyd base paints.

Pigments can be added to the base paint as is or as a pigment concentrate e.g. in the form of a universal colorant.

The major components of an alkyd base paint are alkyd resin, solvent and pigments and fillers. The alkyd base paints may comprise further additives e.g. dispersant. Alkyd resins are condensation product of polybasic acids, polyols and fatty acids or triglyceride oils.

The weight percentage of fatty acids or triglyceride oils used in the production of alkyd resin with respect to the weight of condensation product is defined as the oil length of a particular alkyd resin. Classification of alkyd resins by their oil length is standardized in Europe (DIN55945) but varies in other parts of the world. According to European standard, alkyd resin with oil content of lesser than 40 wt % is classified as short oil alkyd, that with oil content of 40-60 wt % is classified as medium oil alkyd, that with 60-70 wt % oil content is classified as long oil alkyd while that with oil content of more than 70 wt % is classified as very long oil alkyd (Ullmann's Encyclopedia of Industrial Chemistry, Chapter on Alkyd Resins).

A compatibilizer is an additive that helps to improve the compatibility between waterborne universal colorants and the solventborne base paint.

Without a compatibilizer, solventborne base paints especially alkyd base paints mix poorly with the universal colorant. The delta E of a nib-out of a resultant coating will thus be extremely high. Moreover, the color strength of the coating will also be lower. A suitable compatibilizer is able to reduce the delta E of a rub-out to a much lower value while at the same time the compatibilizer will increase color strength. Compatibilizers can be used in post addition to the alkyd base paint and/or as co-dispersant in the base paint or in the universal colorant.

However, the compatibilizer may influence drying and yellowing behavior of the final paints. It may also have strong influence on the stability of the final paint.

Compatibilizers so far are specific towards pigment type, i.e. either specific for use with universal colorants comprising organic pigments or specific for use with universal colorants comprising inorganic pigments. Those compatibilizers that work with inorganic pigment do not show efficacy in cases that contain organic pigments in the colorant and vice versa.

SUMMARY OF THE INVENTION

It is thus an object of the present invention to provide solventborne alkyd paint compositions comprising waterborne universal colorants, solventborne alkyd base paints and a compatibilizer that can be used with both, universal colorants of inorganic pigments and universal colorants of organic pigments. This compatibilizer should allow drying of the final coating within a reasonable time frame of 8 hours.

This object is achieved by a solventborne alkyd paint composition comprising a universal colorant of organic pigment or inorganic pigment, a solventborne alkyd base paint and a fatty acid amidoamine, said fatty acid amidoamine is the condensation product of a fatty acid or their corresponding ester or fatty oil and a polyamine, characterized in that the polyamine is an aliphatic polyamine with an amine functionality of at least 2 and that the polyamine comprises at least one primary amine group and at least one tertiary amine group.

As used herein the term "solvent" refers to organic solvents.

It should be noted that the term "fatty acid" encompasses mixtures of fatty acids or their corresponding ester or fatty oil and the term "polyamine" also encompasses mixtures of polyamines. For the avoidance of doubt it is also noted that solventborne alkyd base paints require organic solvents and not water for their preparation.

It has been found that modified polyamines can be effective compatibilizers for universal colorants. The polyamines could be modified via epoxide ring-opening reaction with suitable epoxides, aza-Michael reaction with suitable α,β-unsaturated compounds or amidation reaction with fatty acid or their corresponding ester or fatty oil with the aim of imparting hydrophobic character to the resultant adducts.

DETAILED DESCRIPTION OF THE INVENTION

Within the framework of the present invention it has been found that for use in solventborne alkyd paint compositions comprising solventborne alkyd base paints and universal colorants, fatty acid amidoamines have excellent compatibilizing capabilities provided that the fatty acid amidoamine is the condensation product of a fatty acid or their corresponding ester or fatty oil and an aliphatic polyamine with an amine functionality of at least 2 and that the polyamine comprises at least one primary amine and at least one tertiary amin.

Fatty acid amidoamines made by condensing fatty acids or their corresponding ester or fatty oil and various amines are known in the art. Their use as epoxy curing agent is described e.g. in U.S. Pat. No. 2,705,223.

US 2005/0148740 discloses fatty acid amidoamines which comprise the reaction product of at least one aliphatic monobasic carboxylic acid, triethylenetetraamine and an amine selected from homologs of polyethylenepolyamines or cyclic polyamines and their use as epoxy curing agent.

US 2015/0344706 discloses fatty acid amidoamines that are used as plastifiers for adducts formed from epoxide resins and amines. Such plastified adducts can be used as cationic paint additives.

The fatty acid amidoamines that are used as compatibilizer according to the present invention are preferably produced from a condensation reaction of a fatty acid mixture or their corresponding ester or fatty oil and a polyamine mixture.

Thus, the invention also pertains to a process for producing a solventborne alkyd paint composition comprising the steps of reacting a fatty acid of the general formula R—COOH or their corresponding ester or fatty oil, where R could be any aliphatic carbon chain with the number of carbons ranging from 3 to 25 and a polyamine with an amine functionality of at least 2, said polyamine comprising at least one primary amine and at least one tertiary amine, at a temperature between 100° C. and 200° C. in a condensation reaction, with a mole ratio of fatty acid to polyamine in the range of 3:1 to 1:3 and mixing the reaction product of the condensation reaction with a universal colorant of organic pigment or inorganic pigment and a solventborne alkyd base paint.

The mole ratio of fatty acid or their corresponding ester or fatty oil to polyamine lies preferably within the range of 2:1 to 1:2. Most preferably, the mole ratio should be within the range of 1.5:1 to 1:1.5.

The final acid value of the fatty acid amidoamine should be less than 60 mg KOH/g. More preferably, the final acid value of fatty amidoamine should be less than 50 mg KOH/g. Most preferably, the final acid value of the fatty amidoamine should be less than 40 mg KOH/g. The final acid value is determined according to DIN EN ISO 2114.

The final amine value of the fatty acid amidoamine is preferably at least 50 mg KOH/g. More preferably, the final amine value of fatty acid amidoamine is at least 100 mg KOH/g. Most preferably, the final amine value of the fatty acid amidoamine is at least 150 mg KOH/g. The final amine value is determined according to DIN 53176.

Suitable fatty acids are of the general formula R—COOH, where R could be any aliphatic carbon chain with the number of carbons ranging from 3 to 25. The aliphatic carbon chain R can have a varying degree of unsaturation and branching Preferably, the number of carbons in R ranges from 7 to 21. In the most preferred embodiment, R should be in the range of 7 to 17 in carbon chain length.

It should also be noted that the fatty acids used for the condensation reaction could be derived from bio-based feedstock or petroleum based feedstock or mixtures thereof. The fatty acids or their corresponding ester or fatty oil can be in their alkyl ester or glyceride form and directly be converted with polyamines to amidoamines.

It is also possible that a certain amount of the fatty acid mixture is a dimerized fatty acid. It is preferred that the amount of dimerized fatty acid is less than 5% of total fatty acid content.

Preferably the fatty acids are selected from the group consisting of tall oil fatty acid, coconut fatty acid, myristic acid, lauric acid, decanoic acid, nonanoic acid, octanoic acid and mixtures thereof or their corresponding ester or fatty oil.

According to the present invention, the polyamine used in the condensation reaction should be an aliphatic polyamine with an amine functionality of at least 2. It should be understood that the term aliphatic also includes cycloaliphatic structures.

The polyamines comprise at least one primary amine and at least one tertiary amine. Without wishing to be bound by theory it is assumed the unique structure of the resulting fatty acid amidoamine that contains at least one tertiary amine is very beneficial to the color strength as well as a low delta E of rubout.

Especially preferred is a cycloaliphatic polyamine with a least one amine functional group attached to the ring structure and at least one tertiary amine such as aminoethylpiperazine (AEP).

In yet another preferred embodiment, the polyamine comprising at least one primary amine and at least one tertiary amine should be a linear aliphatic polyamine, such as dimethylaminopropylamine (DMAPA), diethylaminopropylamine, dimethylaminoethylamine and N-methyldipropylenetriamine with dimethylaminopropylamine (DMAPA) being most preferred.

Thus, most preferably the polyamine is selected from the group consisting of aminoethylpiperazine (AEP), dimethylaminopropylamine (DMAPA) and mixtures thereof.

AEP and DMAPA were unexpectedly found to have excellent compatibilizing effect with both inorganic and organic pigments.

The following condensation products are preferred for use as compatibilizer in solventborne alkyd paint compositions comprising solventborne alkyd base paints and universal colorants of organic or inorganic pigments:

Fatty acid of the general formula R—COOH, with R ranging from 11 to 17 and AEP,

Fatty acid is selected from the group consisting of tall oil fatty acid, myristic acid, lauric acid, coconut fatty acid, decanoic acid, nonanoic acid, octanoic acid and mixtures thereof and the polyamine is aminoethylpiperazine (AEP)

tall oil fatty acid and AEP, myristic acid and AEP lauric acid and AEP

Fatty acid of the general formula R—COOH, with R ranging from 7 to 10 and DMAPA fatty acid is selected from the group consisting of tall oil fatty acid, myristic acid, lauric acid, coconut fatty acid, decanoic acid, nonanoic acid, octanoic acid and mixtures thereof and the polyamine is dimethylaminopropylamine (DMAPA)

octanoic acid and DMAPA tall oil fatty acid and DMAPA coconut fatty acid and DMAPA Alkylolaminoamides, e.g. Disperbyk 109, can be used to improve color acceptance for universal colorants containing organic pigments in solventborne alkyd paints. On the other hand, for universal colorants containing inorganic pigments, phosphate compatibilizers, such as Disperbyk 102, or sulfonate compatibilizers are usually required.

Surprisingly, fatty acid amidoamines according to the present invention are able to work on both types of pigments. In addition, fatty acid amidoamines according to the present invention also work on universal colorants containing carbon black as pigment.

Known compatibilizers, e.g. Disperbyk 109, can only be used with both, universal colorants of inorganic pigments and universal colorants of organic pigments if large amounts of an organic co-solvent are added to the water matrix. Even then the compatibilizing effect might still be unsatisfactory. In addition, if a co-solvent with a low boiling point is used the universal colorant will have a high level of volatile organic compounds VOC. If a co-solvent with a high boiling point, e.g. PEG is used, it will have a negative impact on the drying time.

It is thus preferred that the universal colorant contains less than 20 wt % of an organic co-solvent, more preferably less than 15 wt % of an organic co-solvent, even more preferred is a content of less than 10 wt % or less than 5 wt % of organic co-solvent and most preferred is a universal colorant that is free of organic co-solvent.

However, the presence of additional amine groups within the fatty amidoamine structure may adversely affect drier performance in the alkyd paint composition to an unacceptable level. The problem can be mitigated by including cycloaliphatic diamine into the polyamine mixture. The preferred cycloaliphatic diamines are isophorone diamine (IPDA) and methylenebis (cyclohexylamine) (PACM). The amount of addition is preferably less than 30 mole % of total amine used. More preferably, the amount added is less than 25 mole % of total amine used.

To achieve the compatibilizing effect, the fatty acid amidoamine described in this invention could be used in post addition to the solventborne alkyd paint formulation and/or as co-dispersant in the base paint or in the universal colorant.

The dosage of the fatty acid amidoamine should be within the range of 0.1% to 5%, by weight, of total paint formulation. More preferably, the dosage should be 0.3% to 4%, by weight, of total paint formulation. Most preferably, the dosage should be 0.5% to 3%, by weight, of total paint formulation.

The invention is further illustrated by means of the following examples which should by no means be construed as limiting the scope of the present invention.

Having generally described this invention, a further understanding can be obtained by reference to certain specific examples which are provided herein for purposes of illustration only, and are not intended to be limiting unless otherwise specified.

EXAMPLES

Example 1—Synthesis of Fatty Amidoamine

The synthesis of the fatty acid amidoamine follows typical reaction conditions known to person skilled in the art. The fatty acid and polyamine are mixed and reacted at a temperature of 150 to 200° C. for a period of 4-8 hours.

The following fatty acid amidoamines were produced:

| Fatty acid or oil component | Polyamine component | Mole ratio of fatty acid to polyamine | Acid value (mg KOH/g) | Amine value (mg KOH/g) |
|---|---|---|---|---|
| A1 Tall oil fatty acid (69 wt %) | AEP (31 wt %) | 1:1 | 4.9 | 131.9 |
| A2 Myristic acid (64 wt %) | AEP (36 wt %) | 1:1 | 3.0 | 176.0 |
| A3 Lauric acid (61 wt %) | AEP (39 wt %) | 1:1 | 3.2 | 192.7 |
| A4 Tall oil fatty acid (25 wt %) Decanoic acid (35 wt %) | AEP (30 wt %) IPDA (10 wt %) | 1:1 | 4.0 | 186.2 |
| A5 Tall oil fatty acid (46 wt %) Nonanoic acid (17 wt %) | AEP (31 wt %) PACM (6 wt %) | 1:1 | 7.3 | 172.7 |
| A6 Tall oil fatty acid (54 wt %) Lauric acid (20 wt %) | DMAPA (26 wt %) | 1:1 | 23.0 | 147.8 |
| A7 Octanoic acid (61 wt %) | DMAPA (39 wt %) | 1:1 | 30.0 | 220.8 |
| A8 Coconut oil (67 wt %) | DMAPA (37 wt %) | 1:1 | 1.0 | 170.0 |

AEP—aminoethylpiperazine
IPDA—isophorone diamine
PACM—methylenebis(cyclohexylamine)
DMAPA—dimethylaminopropylamine

Example 2—Preparation of Universal Colorant

Universal colorants with organic pigment:

| Component | By weight % | Generic Name | Manufacturer |
|---|---|---|---|
| Deionised water | 43.9 | N/A | N/A |
| TEGO ® Dispers 653 | 20.0 | Dispersant, modified polyether | Evonik Industries AG |
| TEGO ® Foamex 810 | 1.0 | Defoamer, polyethersiloxane copolymer | Evonik Industries AG |
| Hostaperm Pink E | 35.0 | Organic pigment quinacridone red 122 | Clariant International Ltd |
| Mergal V541 | 0.1 | In-can preservative | Troy Asia Company |
| Total | 100.0 | N/A | N/A |

Dispersant solid on pigment is 20% based on 35% solid dispersant

Universal Colorants with Inorganic Pigment:

| Component | By weight % | Generic Name | Manufacturer |
|---|---|---|---|
| Deionised water | 28.9 | N/A | N/A |
| TEGO ® Dispers 653 | 10.0 | Dispersant, modified polyether | Evonik Industries AG |
| TEGO ® Foamex 810 | 1.0 | Defoamer, polyethersiloxane copolymer | Evonik Industries AG |
| Bayferrox 130M | 60.0 | Inorganic pigment iron oxide red 101 | LANXESS AG |
| Mergal V541 | 0.1 | In-can preservative | Troy Asia Company |
| Total | 100.0 | N/A | N/A |

Dispersant solid on pigment is 6% based on 35% solid dispersant

Pigments Hostaperm Pink E and Bayferrox 130M were chosen by way of example to represent organic pigment and inorganic pigment, respectively.

Example 3—Preparation of Solventborne Alkyd Base Paint

The solventborne base paint based on long oil alkyd was prepared with the components given below:

| Component | By weight % | Generic Name | Manufacturer |
|---|---|---|---|
| Worleekyd SD7003 | 50.50 | Air dry long oil alkyd resin | Worlee-Chemie GMBH |
| WorleeThix 670 HS | 5.00 | Thixotropic long oil alkyd resin | Worlee-Chemie GMBH |
| TEGO ® Dispers 628 | 0.40 | Dispersant | Evonik Industries AG |
| Permablend VPA 307 | 0.05 | Optical brightener | Worlee-Chemie GMBH |
| Kronos 2310 | 30.00 | Titanium dioxide pigment | Kronos International |
| White Spirit | 10.80 | Solvent | N/A |
| Drier Cobalt 10 | 0.30 | Paint drier | Dura Chemicals |
| Drier Calcium 10 | 0.70 | Paint drier | Dura Chemicals |
| Drier Zirconium 12 | 0.55 | Paint drier | Dura Chemicals |
| WorleeAdd 373N | 1.00 | Defoamer | Worlee-Chemie GMBH |
| DuraMEK #2 | 0.50 | Anti-skinning agent | Dura Chemicals |
| White Spirit | 0.20 | Solvent | N/A |
| Total | 100.0 | N/A | N/A |

Example 4—Preparation of Solventborne Alkyd Paint Composition

Universal colorant of example 2 and solventborne base paint of example 3 were mixed together with the required amount of compatibilizers A1 to A8 of example 1 as shown below:

| | Weight % |
|---|---|
| Solventborne alkyd base paint | 96.0 |
| Universal colorant | 3.0 |
| Compatibilizer | 1.0 |
| Total | 100.0 |

Example 5—Testing of Solventborne Alkyd Paint Compositions with Solventborne Alkyd Base Paint, Universal Colorant of Organic Pigment and Fatty Acid Amidoamines A1-A8

The paint films were subjected to rub-out test, color strength measurement and drying time determination.

Run-out test: suitable amount of solventborne alkyd base paint, universal colorant and compatibilizer were weighed and mixed thoroughly by SpeedMixer DAC 150.1 at 2000 rpm for 1 minute. After mixing, a coat of the solventborne alkyd paint was applied on a non-absorbent white card at a wet film thickness of approximately 150 microns. The coating was allowed to flash off for 30 seconds or until just before the state of initial drying was reached. Using finger, about ¼ of the paint surface was rubbed out to constant color (standardized at 10 rubs). After the paint film has cured, the difference in color (delta E) of the rubbed out area and unrubbed area was determined according to ASTM D2244-15a. The lower the delta F value, the more effectively the pigments are stabilized towards flocculation and separation phenomenon.

Color strength measurement: using the same dried paint film panel from rub-out test, color strength, F, of the unrubbed area was computed from the Y value (CIE 1931 XYZ) based on the modified version of the Kubelka-Munk equation. Y value was obtained using a spectrophotometer (Konica Minolta, CM600D) that determine tristimulus X, Y, Z values or L*, a* and b* values which correspond to lightness, undertone on the red/green scale and undertone on the yellow/blue scale, respectively. Color Strength is a measurement of the ability of a pigment to absorb incident light and color a medium. It has practical importance in coloring white base paint: the stronger (higher F value) the tinting color the more cost-effective it is.

Drying Time: A coat of the solventborne alkyd paint was casted on a glass plate giving a wet film thickness of approx. 150 microns. Surface dry time was determined according to ASTM D1640.

Results for paint film for solventborne long oil alkyd base paint with universal colorant containing organic pigment Hostaperm Pink E:

| | Blank | A1 | A2 | A3 | A4 | A5 | A6 | A7 | A8 | [a]Comp 1 | [b]Comp 2 |
|---|---|---|---|---|---|---|---|---|---|---|---|
| F | 23.9 | 43.9 | 56.8 | 60.8 | 51.5 | 66.8 | 52.8 | 65.6 | 64.4 | 31.9 | 43.0 |
| [c]% reduction in ΔE | — | 22% | 59% | 74% | 62% | 87% | 65% | 93% | 85% | [d]34% | 19% |
| Drying time (hours) | 3.0 | 5.1 | 5.9 | 6.3 | 5.4 | 4.3 | 3.5 | 3.5 | 3.0 | 3.8 | 4.2 |

[a]Disperbyk 102
[b]Disperbyk 109
[c]With respect to blank
[d]Severe flocculation lead to apparent small ΔE and hence value does not indicate improvement in compatibility
Blank - solventborne alkyd paint composition without compatibilizer
A1 to A8 - solventborne alkyd paint composition with fatty acid amidoamine A1 to A8
Comp 1 - comparative example 1 prepared with competitor product Disperbyk 102, a phosphorylated fatty alcohol ethoxylate
Comp 2 - comparative example 2 prepared with competitor product Disperbyk 109, an alcohol functional amide.

Example 5 illustrates the excellent compatibilizing effect of fatty amidoamines in solventborne alkyd paint compositions comprising universal colorants of organic pigments and solventborne alkyd base paints.

The color strength values F exceed those of comparative example 1 which is meant for inorganic pigments but also those of comparative example 2 which is meant to be used for organic pigments.

In addition, the reduction of ΔE always exceeds those of comparative example 2 which uses a product specifically intended for use with organic pigments, while the drying time always stays well below an acceptable range of eight hours.

Example 6—Testing of Solventborne Alkyd Paint Compositions with Solventborne Alkyd Base Paints, Universal Colorant of Inorganic Pigment and Fatty Acid Amidoamines A1-A8

Paint films of example 6 were subjected to coloristic measurement, rub-out test and drying time determination as described in example 5.

Results for paint film for solventborne long oil alkyd base paint with universal colorant containing inorganic pigment Bayferrox 130M:

|  | Blank | A1 | A2 | A3 | A4 | A5 | A6 | A7 | A8 | $^a$Comp 1 | $^b$Comp 2 |
|---|---|---|---|---|---|---|---|---|---|---|---|
| F | 43.1 | 76.5 | 74.2 | 74.0 | 75.4 | 78.3 | 73.6 | 74.9 | 72.7 | 73.0 | 56.5 |
| $^c$% reduction in ΔE | — | 91% | 92% | 92% | 95% | 90% | 97% | 96% | 94% | 80% | 14% |
| Drying time (hours) | 2.7 | 5.5 | 6.3 | 6.5 | 5.8 | 4.8 | 3.5 | 3.5 | 2.8 | 3.4 | 3.5 |

$^a$Disperbyk 102
$^b$Disperbyk 109
$^c$With respect to blank

In example 6 the same fatty acid amidoamines were used to prepare the solventborne alkyd paint compositions as in example 5.

Example 6 illustrates the excellent compatibilizing effect of fatty acid amidoamines in solventborne alkyd paint compositions comprising universal colorants of inorganic pigments and solventborne alkyd base paints.

The color strength values F exceeds those of comparative example 2 which is meant to be used for organic pigments and matches or exceeds those of comparative example 1 which is meant for inorganic pigments.

In addition, the reduction of ΔE always exceeds those of comparative example 1 and comparative example 2, while the drying time stays well below an acceptable range of eight hours.

Examples 5 and 6 show that the fatty acid amidoamines according to the present invention exhibit an excellent compatibilizing effect for both, universal colorants of organic pigment and of inorganic pigment.

Numerous modifications and variations on the present invention are possible in light of the above teachings. It is therefore to be understood that within the scope of the appended claims, the invention may be practiced otherwise than as specifically described herein.

The invention claimed is:

1. A solventborne alkyd paint composition, comprising:
   a universal colorant of organic pigment or inorganic pigment;
   a solventborne alkyd base paint; and
   a fatty acid amidoamine,
   wherein
   the fatty acid amidoamine is the condensation product of a fatty acid or their corresponding ester or fatty oil and a polyamine,
   the polyamine is an aliphatic polyamine having an amine functionality of at least 2, and
   the polyamine comprises at least one primary amine group and at least one tertiary amine group.

2. The solventborne alkyd paint composition according to claim 1, wherein the polyamine is selected from the group consisting of aminoethylpiperazine (AEP), dimethylaminopropylamine (DMAPA), diethylaminopropylamine, dimethylaminoethylamine, N-methyldipropylenetriamine and mixtures thereof.

3. The solventborne alkyd paint composition according to claim 2, wherein the polyamine is selected from the group consisting of aminoethylpiperazine (AEP), dimethylaminopropylamine (DMAPA), and mixtures thereof.

4. The solventborne alkyd paint composition according to claim 1, wherein the polyamine additionally comprises isophorone diamine (IPDA), methylenebis(cyclohexylamine) (PACM) or mixtures thereof in an amount of less than 30 mole % of total amine used.

5. The solventborne alkyd paint composition according to claim 1, wherein the fatty acid is of formula R—COOH, wherein R is an aliphatic carbon chain with the number of carbons ranging from 3 to 25.

6. The solventborne alkyd paint composition according to claim 5, wherein R is an aliphatic carbon chain with the number of carbons ranging from 7 to 17.

7. The solventborne alkyd paint composition according to claim 6, wherein the fatty acid is selected from the group consisting of tall oil fatty acid, coconut fatty acid, myristic acid, lauric acid, decanoic acid, nonanoic acid, octanoic acid and mixtures thereof.

8. The solventborne alkyd paint composition according to claim 1, wherein the fatty acid amidoamine content is in the range of 0.1% to 5%, by weight, of total paint formulation.

9. A process for producing the solventborne alkyd paint composition according to claim 1, comprising:
   reacting a fatty acid of formula R—COOH, wherein R is an aliphatic carbon chain with the number of carbons ranging from 3 to 25 with a polyamine having an amine functionality of at least 2, the polyamine comprising at least one primary amine group and at least one tertiary amine group, at a temperature between 100° C. and 200° C. in a condensation reaction, with a mole ratio of fatty acid to polyamine in the range of 3:1 to 1:3, to obtain a reaction product;
   and mixing the reaction product of the condensation reaction with a universal colorant of organic pigment or inorganic pigment and a solventborne alkyd base paint.

10. The process for producing a solventborne alkyd paint composition according to claim 9, wherein in the reacting, a fatty acid of the formula R—COOH, wherein R is an aliphatic carbon chain with the number of carbons ranging from 7 to 17 is reacted with a polyamine comprising at least one primary amine and at least one tertiary amine.

* * * * *